(12) United States Patent
Deschamps et al.

(10) Patent No.: US 11,508,991 B2
(45) Date of Patent: Nov. 22, 2022

(54) USE OF A SALT MIXTURE AS AN ADDITIVE IN A LITHIUM-GEL BATTERY

(71) Applicant: BLUE SOLUTIONS, Ergue Gaberic (FR)

(72) Inventors: Marc Deschamps, Quimper (FR); Renaud Bouchet, La Tronche (FR); Margaud Lecuyer, Combrit (FR); Julien Rolland, Lille (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 295 days.

(21) Appl. No.: 16/765,117

(22) PCT Filed: Nov. 19, 2018

(86) PCT No.: PCT/FR2018/052896
§ 371 (c)(1),
(2) Date: May 18, 2020

(87) PCT Pub. No.: WO2019/097189
PCT Pub. Date: May 23, 2019

(65) Prior Publication Data
US 2020/0350630 A1    Nov. 5, 2020

(30) Foreign Application Priority Data

Nov. 20, 2017   (FR) .................... 17 60903

(51) Int. Cl.
| | |
|---|---|
| *H01M 10/0568* | (2010.01) |
| *H01M 10/052* | (2010.01) |
| *H01M 10/0565* | (2010.01) |
| *H01M 4/38* | (2006.01) |
| *H01M 4/40* | (2006.01) |
| *H01M 4/58* | (2010.01) |
| *H01M 4/02* | (2006.01) |

(52) U.S. Cl.
CPC ....... *H01M 10/0568* (2013.01); *H01M 4/382* (2013.01); *H01M 10/052* (2013.01); *H01M 10/0565* (2013.01); H01M 4/405 (2013.01); H01M 4/5825 (2013.01); H01M 2004/028 (2013.01); H01M 2300/0025 (2013.01); H01M 2300/0085 (2013.01)

(58) Field of Classification Search
CPC ........................................ H01M 10/056–0569
See application file for complete search history.

(56) References Cited

U.S. PATENT DOCUMENTS

| | | |
|---|---|---|
| 2014/0050990 A1 | 2/2014 | Yuan et al. |
| 2015/0188187 A1 | 7/2015 | Strand et al. |
| 2015/0280277 A1 | 10/2015 | Fleischmann et al. |
| 2015/0311492 A1 * | 10/2015 | Wang .................. H01M 50/46 429/188 |
| 2017/0263978 A1 | 9/2017 | Koh et al. |
| 2018/0277885 A1 * | 9/2018 | Takami ................ H01M 6/045 |

OTHER PUBLICATIONS

International Search Report dated Jan. 31, 2019.

* cited by examiner

*Primary Examiner* — Jonathan Crepeau
(74) *Attorney, Agent, or Firm* — Greer, Burns & Crain, Ltd

(57) ABSTRACT

The invention relates to the simultaneous use of a first salt comprising a nitrate anion ($NO_3^-$) and a second salt comprising an anion other than nitrate, at least one of the first and second salts being a lithium salt, as ionic conductivity promoters in a rechargeable lithium-metal-gel battery. The invention also relates to a lithium-gel battery comprising a mixture of said first salt and said second salt, to a non-aqueous gel electrolyte comprising such mixture and to a lithium battery positive electrode comprising said mixture.

17 Claims, 2 Drawing Sheets

USE OF A SALT MIXTURE AS AN ADDITIVE IN A LITHIUM-GEL BATTERY

RELATED APPLICATION

This application is a National Phase of PCT/FR2018/052896 filed on Nov. 20, 2018, which claims priority to French Patent Application No. FR 17 60903 filed on Nov. 20, 2017, the entirety of which are incorporated by reference.

The present invention relates to the general technical field of lithium batteries.

More particularly, the invention relates to the use of nitrate ions as co-anions in a rechargeable lithium-metal-gel battery not comprising polysulfide ions. In particular, the invention relates to the simultaneous use of a first salt comprising a nitrate anion ($NO_3^-$) and a second salt comprising an anion other than nitrate, at least one of the first and second salts being a lithium salt, as ionic conductivity promoters in a rechargeable lithium-metal-gel battery. The invention also relates to a lithium-gel battery comprising a mixture of said first salt and said second salt, to a non-aqueous gel electrolyte comprising such mixture and to a lithium battery positive electrode comprising said mixture.

DESCRIPTION OF THE RELATED ART

Lithium batteries are particularly suitable for use in motor vehicles and for the stationary storage of electrical energy.

Among lithium batteries, lithium-metal-polymer (LMP) batteries are "all-solid" batteries, usually in the form of an assembly of superimposed thin films. They are composed of four functional films: i) a negative electrode (anode) made of lithium metal or lithium alloy which provides the supply of lithium ions during battery discharge, ii) a solid polymer electrolyte which conducts lithium ions, iii) a positive electrode (cathode) composed of an active electrode material which acts as a receptacle in which lithium ions are intercalated, and iv) a current collector in contact with the positive electrode which provides the electrical connection.

The solid polymer electrolyte is generally composed of a poly(ethylene oxide) (PEO)-based polymer and at least one lithium salt; the positive electrode is usually a material whose working potential is less than 4V vs $Li^+/Li$ such as for example a metal oxide (such as for example $V_2O_5$, $LiV_3O_8$, $LiCoO_2$, $LiNi_yMn_xCo_zO_2$ (with x+y+z=1), (for example the compounds ⅓, ⅓, ⅓, and 0.6, 0.2, 0.2), $LiNiO_2$, $LiMn_2O_4$ and $LiNi_{0.5}Mn_{0.5}O_2$ ...) or a phosphate of the $LiMPO_4$ type, where M represents a metal cation selected from the group Fe, Mn, Co, Ni and Ti, or combinations of these cations, such as for example $LiFePO_4$, and also contains carbon and a polymer; and the current collector generally consists of a metal foil. The conductivity of the ions is ensured by dissolving the lithium salt in the polymer used in the solid electrolyte.

Lithium batteries, especially LMP batteries, have a number of advantages.

Firstly, the mass density of LMP batteries is of the order of 120 to 180 Wh/kg, i.e. an energy density at least 2.5 times higher than that of lead-acid car batteries (30-50 Wh/kg). LMP batteries do not have a memory effect and therefore do not need to be completely discharged before recharging, as is the case with some other technologies (Ni—Cd). Finally, with a voltage identical to that of lithium-ion batteries (around 3.4 V), LMP batteries are maintenance-free and have a life of almost 10 years, which is of interest commercially and makes them relevant for applications requiring electric traction.

However, LMP batteries have a major disadvantage. In order to use them, they must be kept at a temperature of about 60-80° C., which means that it is almost necessary to keep them charged by leaving the vehicle plugged in when it is not in motion. Otherwise, LMP batteries will run down in a few days due to their temperature maintenance.

One solution to overcome this problem is the use of lithium batteries comprising, as in LMP batteries, a negative electrode made of a lithium-metal foil or a lithium alloy and a positive electrode made of a material capable of inserting lithium ions, but in which the polymer electrolyte is replaced by a gel electrolyte (lithium-metal-gel batteries). These batteries indeed have lower operating temperatures than those of LMP batteries, in particular of the order of 0 to 60° C. However, during operation of these batteries, a lithium foam forms on the surface of the negative electrode. This lithium foam is due to a poor-quality electrodeposition on the negative electrode, which affects the life of such batteries, in particular due to a lack of robustness of the passivation layer on the surface of the lithium electrode.

Indeed, when the battery is in operation a passivation layer, called the solid electrolyte interface (SEI), is formed on the negative electrode. This passivation layer is produced by reducing the electrolyte on the surface of the negative electrode during the first cycle of the battery, consuming some of the lithium ions present in the electrolyte. This passivation layer is essential for the proper functioning of the negative electrode and its quality is the decisive factor for its future performance and that of the battery containing it. It must have a certain number of qualities: i) be sufficiently conductive of lithium ions, ii) non-conductive of electrons and iii) have good mechanical resistance. When the quality of the passivation layer is too low, there is a progressive loss of capacity and/or coulombic efficiency of the battery and a reduction in its life.

Various solutions have already been proposed to improve the quality of the passivation layer in lithium batteries comprising a lithium-metal negative electrode, in particular the addition of additives, especially in the composition of the electrolyte.

A particular example is the addition of vinylene carbonate as described for example by H. Ota et al. (Electrochimica Acta, 2004, 49, 565-572).

However, these solutions are not entirely satisfactory, in particular because the lithium salts normally used in lithium batteries are still expensive and the cyclabilities, even in the presence of such additives, are limited to fewer than 100 cycles.

It is also known to use lithium nitrate as an additive in the electrolyte of lithium-sulfur batteries. Lithium-sulfur batteries comprise a negative electrode based on lithium metal or a lithium-based alloy, a positive electrode generally made of porous carbon and comprising a positive electrode active material based on sulfur or a sulfur-containing organic compound, said electrodes being separated by a separator impregnated with an electrolyte comprising lithium ions in solution in a solvent. Lithium-sulfur batteries are one of the most promising electrochemical energy storage systems, such batteries theoretically being capable of achieving high specific capacity and high energy mass density of 1675 $mAh/g_{sulfur}$ and 2600 $Wh/kg_{sulfur}$, respectively. However, interest in lithium-sulfur batteries is tempered by a number of problems, including the problem of the redox shuttle due to the presence of polysulfide ions generated by reduction of sulfur in the positive electrode. The polysulfide ions formed at the positive electrode are soluble in most liquid electrolytes. They therefore migrate to the negative electrode where they are reduced again. This phenomenon considerably slows down the charging of these types of batteries by consuming part of the current to power the redox shuttle. To combat this phenomenon, it has already been proposed, notably by Li W. et al. (Nature Communications, DOI: 10.1038/ncomms8436, 2015, p: 1-8), to add small amounts (of the order of 0.15 M or 0.75 M roughly) of lithium nitrate as an additive in the electrolyte of lithium-sulfur batteries containing a lithium salt and polysulfide ions in order to generate a synergistic effect between said polysulfide ions and the lithium nitrate to form a stable passivation layer, which is supposed to reduce the redox shuttle phenomenon. However, this solution cannot be transposed to batteries which do not have a sulfur-based positive electrode and therefore no polysulfide ions in the electrolyte.

OBJECTS AND SUMMARY

The inventors therefore set themselves the goal of proposing a solution to the problems encountered in lithium-gel batteries. In particular, the inventors set themselves the goal of proposing a solution to improve the life of lithium-gel batteries.

Quite counter-intuitively, the inventors discovered that the use as an additive in a lithium-metal-gel rechargeable battery not comprising polysulfide ions, of a mixture comprising at least two salts, mixture wherein a first salt comprises a nitrate anion ($NO_3^-$) and a second salt comprises an anion other than nitrate, at least one of the first and second salts being a lithium salt, and in particular proportions, improves the quality of the passivation layer, in particular by improving the quality of the lithium deposition on the negative electrode, and thus the life of said battery.

The first subject matter of the present invention is therefore the simultaneous use of:
i) a first salt S1 of the formula $M_\alpha(NO_3)_\beta$ in a molar number n1, and
ii) a second salt S2 of the formula $M'_\gamma A_\delta$ in a molar number n2,
for which:
M and M' are organic or inorganic cations, it being understood that at least one of M and M' is a lithium cation, and
A is an anion,
α, β, γ and δ are such that the electroneutrality of compounds of the formulae $M_\alpha(NO_3)_\beta$ and $M'_\gamma A_\delta$ is respected,
it being understood that:
the molar ratio of salts S1 and S2 ($MR_{S1/S2}$), defined by the following equation (1)

$$\frac{\beta \cdot n_1}{\delta \cdot n_2}, \quad (1)$$

is greater than 1.5,
as ion conductivity promoters in a rechargeable lithium-metal-gel battery comprising at least one positive electrode, at least one non-aqueous electrolyte and at least one negative electrode based on lithium metal or a lithium alloy, said positive electrode and said electrolyte being one or both gelled and forming an {electrolyte+positive electrode} complex, and said battery being free of polysulfide ions.

The presence of the salts S1 and S2 as defined above in said battery advantageously improves the life of the battery.

For the purposes of the present invention, an {electrolyte+positive electrode} complex is understood to mean all the elements constituting the electrolyte and the positive electrode.

According to this use, the salts S1 and S2 may be present, before the s first charge/discharge cycle of said battery, indifferently in the electrolyte and/or in the positive electrode, provided that the molar ratio $RM_{S1/S2}$ defined above is respected.

Thus, the following variants constitute embodiments of said use:

1) the electrolyte contains at least one salt S1 and at least one salt S2 and the positive electrode contains neither salt S1 nor salt S2, or 2) the electrolyte contains neither salt S1 nor salt S2 and the positive electrode contains at least one salt S1 and at least one salt S2, or 3) the electrolyte contains only one salt S1 and the positive electrode contains only one salt S2, or 4) the electrolyte contains only one salt S2 and the positive electrode contains only one salt S1, or 5) the electrolyte and the positive electrode each contain at least one salt S1 and at least one salt S2, the molar ratios of the salts S1 and S2 within the electrolyte ($RM_{S1/S2\ Electrolyte}$) and within the positive electrode ($RM_{S1/S2\ Elect.\ Positive}$) which may be identical or different from one another provided that the molar ratio $RM_{S1/S2}$ within the battery and as defined above is respected, i.e. is greater than 1.5, or 6) the electrolyte contains only one of the salts S1 and S2 and the positive electrode contains at least one salt S1 and at least one salt S2, or 7) the electrolyte contains at least one salt S1 and at least one salt S2 and the positive electrode contains only one of the salts S1 and S2.

According to a preferred embodiment of the invention, the molar ratio $RM_{S1/S2}$ is greater than or equal to 10, and even more preferentially it varies from 10 to 30.

The total amount of salts S1 and S2 present in said battery can also be defined in mass %. In this case, the total amount of salts S1 and S2 is expressed relative to the total mass of the complex comprising the electrolyte and the positive electrode ({electrolyte+positive electrode} complex) and not relative to the total mass of said battery.

Thus, according to a preferred embodiment of the invention, the total mass of salts S1 and S2 within said battery varies from 0.5 to 30 mass %, and even more preferentially from 0.5 to 15 mass %), relative to the total mass of said {electrolyte+positive electrode} complex.

The cations M and M' of the salts S1 and S2 may in particular be selected from alkali metals, in particular from lithium, sodium, potassium, rubidium, cesium and francium. Of course, and as indicated above, at least one of the cations M and M' is a lithium cation.

According to a preferred embodiment of the invention, M and M' are both lithium cations.

Thus, according to a preferred embodiment of the invention, the salt S1 is lithium nitrate ($LiNO_3$).

The anion A may in particular be selected from triflate, perchlorate, perfluorate, hexafluorophosphate ($PF_6^-$), bis(trifluoromethanesulfonyl)imide ($TFSI^-$), bis(fluorosulfonyl)imide ($FSI^-$), bis(pentafluoroethylsulfonyl)imide ($BETI^-$), tetrafluoroborate ($BF_4^-$), and bis(oxalato)borate.

Among the salts S2, particular mention may be made of lithium bis(trifluoromethylsulfonyl)imide (LiTFSI) and lithium bis(fluorosulfonyl)imide (LiFSI), these two salts S2 being particularly preferred according to the invention.

According to a particularly preferred embodiment of the invention, the mixture comprises lithium nitrate as salt S1 and LiTFSI or LiFSI as salt S2.

As detailed above for the first subject matter of the invention, according to variant 1) of an embodiment of the use, the electrolyte comprises at least one salt S1 and at least one salt S2.

The invention therefore also has as a second subject matter a non-aqueous gel electrolyte for a lithium-gel battery, said electrolyte being characterized in that it comprises at least one solvent, at least one gelling polymer and at least one mixture of:
i) a first salt S1 of the formula $M_\alpha(NO_3)_\beta$ in a molar concentration C1 and a molar number n1, and
ii) a second salt S2 of the formula $M'_\gamma A_\delta$ in a molar concentration C2 and a molar number n2, for which:
M and M' are organic or inorganic cations, it being understood that at least one of M and M' is a lithium cation, and
A is an anion,
$\alpha$, $\beta$, $\gamma$ and $\delta$ are such that the electroneutrality of compounds of the formulae $M_\alpha(NO_3)_\beta$ and $M'_\gamma A_\delta$ is respected,
the total molar concentration [C1+C2] of salts S1 and S2 varies from 0.5 to 10 mol/L, and
the molar ratio of salts S1 and S2 ($RM_{S1/S2}$), defined by the following equation (1)

$$\frac{\beta \cdot n_1}{\delta \cdot n_2}, \quad (1)$$

is greater than 1.5.

According to a preferred embodiment of the invention, the molar concentration C1 of salt S1 in said electrolyte is greater than or equal to 1 mol/L, and even more preferentially said molar concentration C1 varies from 1.5 to 5 mol/L.

The solvent(s) of the non-aqueous gel electrolyte may be selected from linear or cyclic ethers, carbonates, sulfur-containing solvents such as sulfolane and dimethyl sulfoxide, linear or cyclic esters (lactones), nitriles, etc.

Among such solvents, particular mention may be made of dimethyl ether, poly(ethylene glycol) dimethyl ethers (PEGDME) such as tetra(ethylene glycol) dimethyl ether (TEGDME), dioxolane, ethylene carbonate (EC), propylene carbonate (PC), dimethyl carbonate (DMC), diethyl carbonate (DEC), methyl isopropyl carbonate (MIPC), ethyl acetate, ethyl butyrate (EB), and mixtures thereof.

Preferably the one or more solvents represent 20 to 89.5 mass %, even more preferentially 35 to 75 mass %, relative to the total mass of the non-aqueous gel electrolyte.

The one or more gelling polymers of the non-aqueous gel electrolyte may be selected from polyolefins such as homopolymers or copolymers of ethylene and propylene, or a mixture of at least two of these polymers; ethylene oxide homopolymers and copolymers (e.g. PEO, copolymer of PEO), methylene oxide, propylene oxide, epichlorohydrin or allyl glycidyl ether, and mixtures thereof; halogenated polymers such as homopolymers and copolymers of vinyl chloride, vinylidene fluoride (PVdF), vinylidene chloride, ethylene tetrafluoride, or chlorotrifluoroethylene, copolymers of vinylidene fluoride and hexafluoropropylene (PVdF-co-HFP) and mixtures thereof; homopolymers and copolymers of styrene and mixtures thereof; vinyl polymers; anionic electronic non-conductive polymers such as poly(styrene sulfonate), poly(acrylic acid), poly(glutamate), alginate, pectin, carrageenan and mixtures thereof; polyacrylates; cellulose acetate; polyamides; polyesters; polyurethane; polyvinyl alcohol; and a mixture thereof.

According to the invention, the one or more polymers preferably represent from 10 to 60 mass %, and even more preferentially from 15 to 50 mass %, relative to the total mass of the non-aqueous gel electrolyte solution.

As indicated above, and according to variant 2), the positive electrode may contain at least one salt S1 and at least one salt S2, the mixture of salts S1 and S2 thus being an ingredient of the material constituting the positive electrode of the battery before its first charge/discharge cycle.

The invention therefore has as a third subject matter, a composite gel positive electrode for a lithium-gel battery, said composite electrode being characterized in that it comprises at least one positive electrode active material capable of reversibly inserting lithium ions, at least one polymeric binder, at least one solvent, at least one gelling polymer and at least one mixture of:
i) a first salt S1 of the formula $M_\alpha(NO_3)_\beta$ in a molar concentration C1 and a molar number n1, and)
ii) a second salt S2 of the formula $M'_\gamma A_\delta$ in a molar concentration C2 and a molar number n2, for which:
M and M' are organic or inorganic cations, it being understood that at least one of M and M' is a lithium cation, and
A is an anion,
$\alpha$, $\beta$, $\gamma$ and $\delta$ are such that the electraneutrality of compounds of the formulae $M_\alpha(NO_3)_\beta$ and $M'_\gamma A_\delta$ is respected,
said mixture being such that:
the total molar concentration [C1+C2] of salts S1 and S2 varies from 0.5 to 10 mol/L, and
the molar ratio of salts S1 and S2 ($RM_{S1/S2}$), defined by the following equation (1)

$$\frac{\beta \cdot n_1}{\delta \cdot n_2}, \quad (1)$$

is greater than 1.5.

The one or more solvents and the gelling polymer or polymers are as defined according to the second subject matter of the invention.

According to the third subject matter of the invention the mixture of salts S1 and S2 preferably represents 0.5 to 10 mass %, and even more preferentially 2 to 6 mass %, relative to the total mass of said positive electrode.

The positive electrode active material may in particular be selected from lithium iron phosphates, vanadium oxides $VO_x$ ($2 \leq x \leq 2.5$), $LiV_3O_8$, $Li_yNi_{1-x}Co_xO_2$ ($0 \leq x \leq 1$; $0 \leq y \leq 1$, $LiNi_yMn_xCo_zO_2$ ((with x+y+z=1), such as for example compounds in which x=⅓, y=⅓ and z=⅓, or x=0.6, y=0.2 and z=0.2), manganese spinels $Li_yMn_{1-x}M_xO_4$ (M=Cr, Al, V, Ni, $0 \leq x \leq 0.5$; $0 \leq y \leq 1$), used alone or in mixtures.

According to a preferred embodiment of the invention, the active material of the positive electrode material is selected from lithium iron phosphates, such as in particular $LiFePO_4$.

The active electrode material preferably represents 55 to 90 mass %, and even more preferably about 70 to 90 mass %, relative to the total mass of the positive electrode material.

The polymeric binder may be selected from PVdF, a copolymer of PVdF, polyoxyethylene (PEO), a copolymer of PEO, a cationic conductive polymer, polyolefins such as in particular polyethylene, polyolefin copolymers such as in particular polyethylene copolymers, polyurethane, polyamides, cellulose acetate, polyesters, polyvinyl alcohol and a mixture thereof.

The polymeric binder preferably represents about 2 to 20 mass %, and even more preferentially 3 to 15 mass %, relative to the total mass of the positive electrode material.

The positive composite electrode may further contain at least one electronic conductive additive. In this case, such an additive may in particular be selected from carbonaceous fillers such as carbon black, graphite, carbon fibers and nanofibers, carbon nanotubes and graphene; particles of at least one conductive metal such as aluminum, platinum, iron, cobalt and nickel; and a mixture thereof.

The electronic conductive additive preferably represents 0 to 10 mass %, and even more preferentially 0 to 3 mass %, relative to the total mass of the positive electrode material.

According to a preferred embodiment of the invention, the positive electrode is deposited on a current collector. The collector of the positive electrode is then preferably made of aluminum, optionally coated with a carbon layer.

Finally, the invention has as a fourth subject matter a lithium-gel battery comprising a positive electrode, a negative electrode based on lithium metal or a lithium alloy, an electrolyte disposed between said positive electrode and said negative electrode, said battery being characterized in that:
  it is free of polysulfide ions, and
  it comprises:
  i) a first salt S1 of the formula $M_\alpha(NO_3)_\beta$ in a molar number n1, and
  ii) a second salt S2 of the formula $M'_\gamma A_\delta$ in a molar number n2,
  for which:
  M and M' are organic or inorganic cations, it being understood that at least one of M and M' is a lithium cation, and
  A is an anion,
  $\alpha$, $\beta$, $\gamma$ and $\delta$ are such that the electroneutrality of compounds of the formulae $M_\alpha(NO_3)_\beta$ and $M'_\gamma A_\delta$ is respected,
  the molar ratio of salts S1 and S2 ($RM_{S1/S2}$), defined by the following equation (1)

$$\frac{\beta \cdot n_1}{\delta \cdot n_2}, \quad (1)$$

is greater than 1.5,
  said salts S1 and S2, independently of each other, being indifferently present, before the first charge/discharge cycle of said battery, within the electrolyte and/or within the positive electrode,
  said positive electrode and said electrolyte both being gelled.

Thus, according to the invention, the salts S1 and S2 are introduced before the first charging of the battery, either as a mixture into the electrolyte and/or the positive electrode, or each of the salts is introduced separately into the electrolyte or the positive electrode of the battery.

According to a preferred embodiment of the invention, the total amount of mixture of salts S1 and S2 in all the elements constituting the {electrolyte+positive electrode} complex varies from 0.5 to 30 mass %, and even more preferentially from 0.5 to 15 mass %, relative to the total mass of said battery.

In the lithium battery according to the present invention, the thickness of the various elements of the battery is generally of the order of 1 to about 100 micrometers.

DETAILED DESCRIPTION

The present invention is illustrated by the following examples, to which, however, it is not limited.

EXAMPLES

The advantage of using a mixture of the salts S1 and S2 as defined according to the present invention in the composition of the electrolyte and/or the positive electrode can be measured by characterizing the lithium electrodeposition in a symmetrical lithium/electrolyte/lithium cell and by monitoring the cycling of complete cells.

Example 1

Demonstration of the Effect of the Mixture of Salts S1 and S2 on the Quality of Lithium Electrodeposition The quality of the lithium electrodeposition could be evaluated by cycling in symmetrical lithium/electrolyte/lithium cells. These tests made it possible to characterize the stability of non-aqueous gel electrolytes in accordance with the invention compared with a non-aqueous gel electrolyte not forming part of the present invention.

The evaluations were carried out with lithium metal; the electrolyte solution alone was evaluated by impregnation of a polyolefin separator sold under the trade name BPF Bolloré Porous Film by Bolloré.

Electrolyte solutions were prepared using LiTFSI as salt S2 (sold by 3M), $LiNO_3$ as salt S1 (sold by Alfa Aesar) and polyethylene glycol) dimethyl ether (PEGDME 250 g/mol sold by Sigma Aldrich). The electrolyte solutions were prepared by dissolving the lithium salts in PEGDME under magnetic stirring at room temperature.

Three electrolyte solutions A, B and C with the composition shown in Table 1 below were evaluated:

TABLE 1

| Solutions | A (*) | B | C |
|---|---|---|---|
| PEGDME (mass %) | 88.00 | 55.00 | 69.00 |
| $LiNO_3$ (mass %) | 3.60 | 13.50 | 24.80 |
| LiTFSI (mass %) | 8.40 | 31.50 | 6.20 |

TABLE 1-continued

| Solutions | A (*) | B | C |
|---|---|---|---|
| Total salt concentration (in mol/L) | 0.9 | 4.2 | 4.8 |
| Molar ratio [NO$_3^-$]/[TFSI$^-$] | 1.8 | 1.8 | 16.7 |
| NO$_3^-$ concentration (in mol/L) | 0.6 | 2.7 | 4.5 |

(*) comparative electrolyte solutions, not being part of the invention.

Only solutions B and C are in accordance with the present invention. In particular, the comparative solution A has the same molar ratio [NO$_3^-$]/[TFSI$^-$] as the solution B in accordance with the invention, but a total salt content of less than 1 mol/L.

Three complete cells were then prepared, each using one of the electrolyte solutions A, B or C as prepared above.

The separator was dipped in the electrolyte solution, the excess solution being removed with absorbent paper and then sandwiched between two sheets of lithium metal, each 50 μm thick. Three cells were thus obtained, referred to as cells A, B and C respectively.

The cells were tested in galvanostatic cycling (constant current) at 40° C., at 300 μA/cm$^2$ for 4 hours, then reversed current direction for 4 hours.

Figure 1:
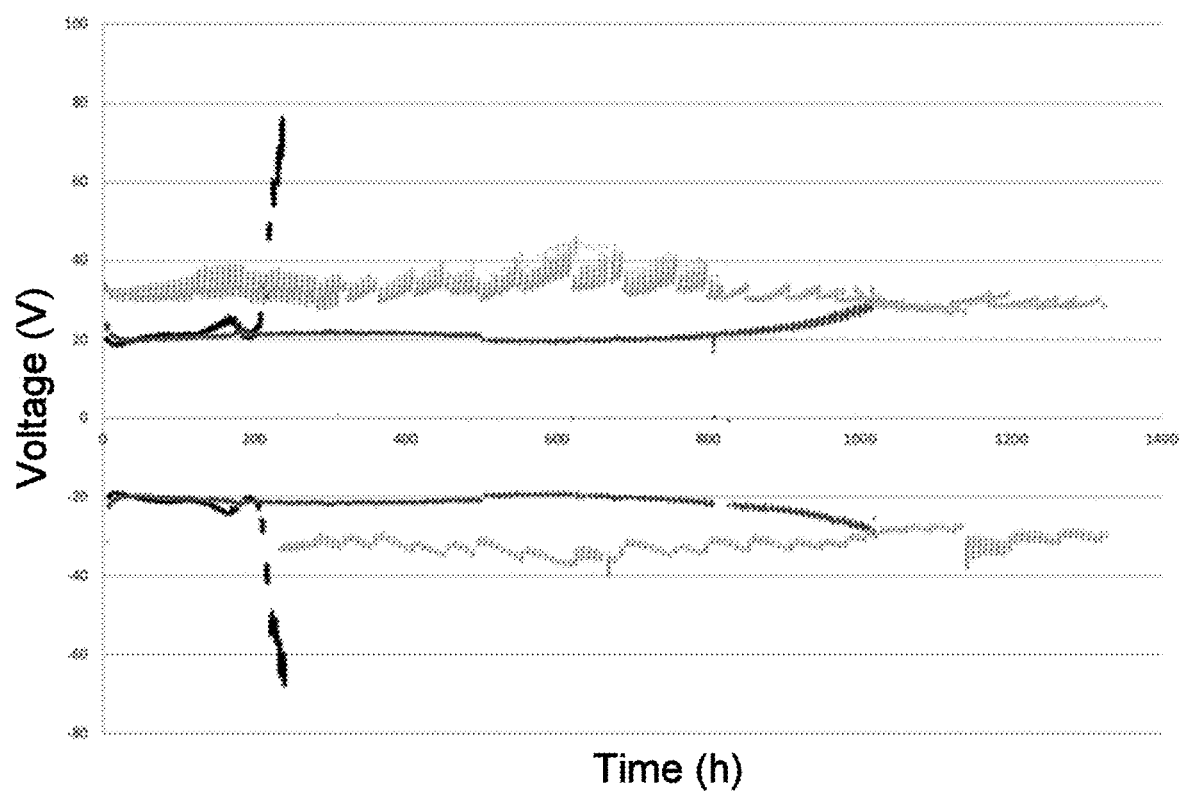
FIG. 1 shows the results from example 1, with the change in voltage (in V) is a function of time in hours, in accordance with one embodiment.

The results obtained are shown in the appended FIG. 1, where the change in voltage (in V) is a function of time in hours. In this figure, the black curve corresponds to cell A comprising electrolyte solution A (cell not in accordance with the invention), the dark grey curve corresponds to cell B comprising electrolyte solution B and the light grey curve corresponds to cell C comprising electrolyte solution C.

These results show the good stability of the cycling polarization of cells B and C in accordance with the invention, whereas cell A not in accordance with the invention has a very poor stability. These results also show that the higher the molar concentration of NO3$^-$, the more stable the polarization is cycle after cycle.

Example 2

Preparation of a Lithium-Gel Battery in Accordance with the Present Invention

A complete cell was prepared with the following constitution:

Gel Electrolyte (According to the Second Subject Matter of the Invention):
  20 g or 40 mass % of a solution comprising 13.75 mass % LiNO$_3$ (or 2.45 mol/L) (Alfa Aesar) and 13.75 mass % LiTFSI (or 0.59 mol/L) (3M) in poly(ethylene glycol) dimethyl ether (PEGDME 250 g/mol sold by Aldrich);
  20 g or 40 mass % PVdF Solef 21510 (Solvay);
  10 g or 20 mass % polyoxyethylene (PEO 1L sold by Sumitomo Seika).

The various components of the gel electrolyte were mixed in a mixer sold under the trade name Plastograph® by Brabender® temperature of 110° C. The resulting mixture was then laminated at 110° C. to form a gel electrolyte film with a thickness of about 20 μm.

The gel electrolyte so prepared had the characteristics summarized in Table 2 below:

TABLE 2

| Components | |
|---|---|
| PEGDME (mass %) | 29.00 |
| LiNO$_3$ (mass %) | 5.5 |
| LiTFSI (mass %) | 5.5 |

TABLE 2-continued

| Components | |
|---|---|
| Total salt concentration (in mol/L) | 3.04 |
| Molar ratio [NO$_3^-$]/[TFSI$^-$] | 4.16 |
| NO$_3^-$ concentration (in mol/L) | 2.45 |

Gel Positive Electrode (A Gel Positive Electrode Comprising a Mixture of LiNO$_3$ and LiTFSI According to the Third Subject Matter of the Invention):
  74 mass % LiFePO$_4$ sold under the trade name LFP P600A by Pulead;
  16 mass % of an electrolyte solution comprising 13.75 mass % (or 2.45 mol/L) LiNO$_3$ (Alfa Aesar) and 13.75 mass % (or 0.49 mol/L) LiTFSI (3M) in poly(ethylene glycol) dimethyl ether (PEGDME 250 g/mol sold by Aldrich);
  8 mass % poly(ethylene oxide) (PEO 1L sold by Sumitomo);
  2 mass % carbon black sold under the trade name Ketjenblack® EC600JD by Akzo Nobel.

The various components of the positive electrode were mixed in a mixer sold under the trade name Plastograph® by Brabender® at a temperature of 110° C. The resulting mixture was then laminated at 80° C. to form a gel positive electrode film with a thickness of about 30 μm.

Cell Assembly:
A 50 μm thick lithium metal strip was used as the negative electrode.

An aluminum current collector having a carbonaceous coating (Armor) was used as a current collector for the positive electrode. The individual lithium/gel electrolyte/gel positive electrode/collector layers were laminated under 5 bar pressure at a temperature of 80° C. to produce the battery. The lamination was carried out in a controlled atmosphere (dew point—40° C.).

The cells thus prepared were then enclosed in a sealed, heat-sealable package to protect them from moisture.

The battery thus prepared was tested in galvanostatic cycling (constant current) at 40° C. The first cycle was carried out at C/10 (charge in 10 hours) and D/10 (discharge in 10 hours) and the following cycles at C/4 (charge in 4 hours) and D/2 (discharge in 2 hours).

Figure 2:
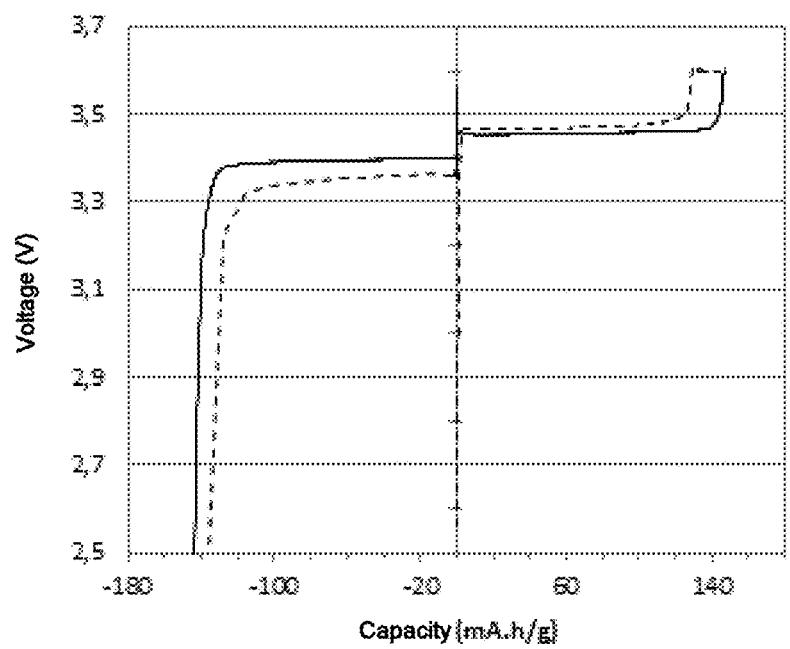
FIG. 2 shows the results from example 2, with the voltage profile (in V) as a function of the discharge capacity of the battery (in mA·h/g), in accordance with one embodiment.

The voltage profile (in V) as a function of the discharge capacity of the battery (in mA·h/g) is shown in the appended FIG. 2. In this figure the solid curve corresponds to cycle 1 (C/10; D/10) and the dotted curve corresponds to cycle 2 (C/4; D/2).

Figure 3:
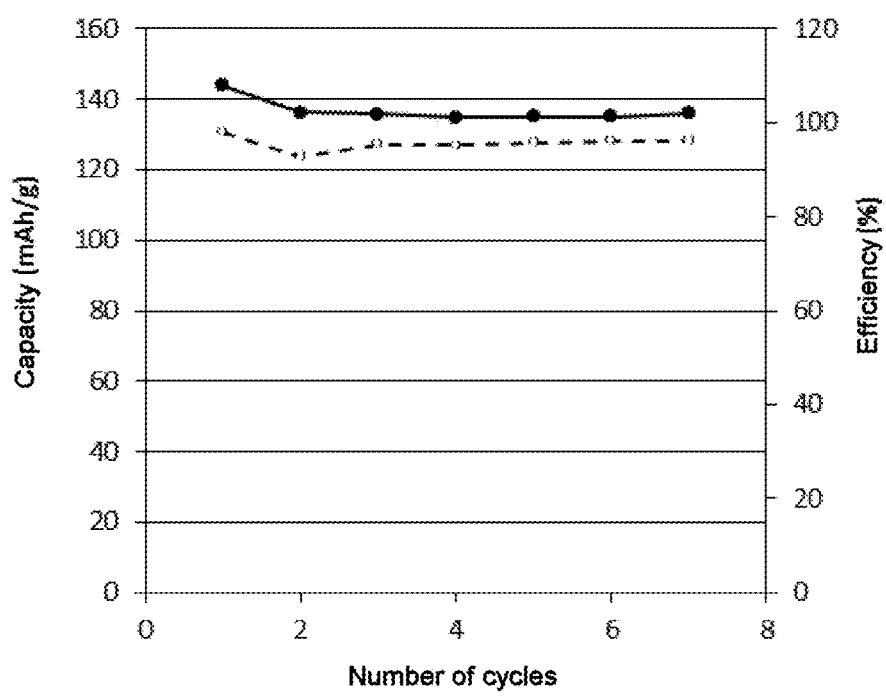
FIG. 3 shows the results from example 2, with the change in the battery discharge capacity (in mAh/g) and the coulombic efficiency (in %) as a function of the number of cycles is shown, in accordance with one embodiment.

The change in the battery discharge capacity (in mAh/g) and the coulombic efficiency (in %) as a function of the number of cycles is shown in the appended FIG. 3. In this figure, the curve with the full circles and the solid line corresponds to the discharge capacity and the curve with the empty circles and the dashed line corresponds to the coulombic efficiency.

What emerges from these results is that the voltage profile shows a low cycling polarization reflecting good kinetics within the battery. In addition, the capacity and efficiency are stable, reflecting a good reversibility of the electrochemical process.

The invention claimed is:

1. An ion conductivity promoter in a rechargeable lithium-metal-gel battery comprising:
  i) a first salt S1 of the formula M$_\alpha$(NO$_3$)$_\beta$ in a molar number n1, ii) a second salt S2 of the formula $M'_\gamma A_\delta$ in a molar number n2, for which:

M and M' are organic or inorganic cations, it being understood that at least one of M and M' is a lithium cation, and A is an anion, $\alpha$, $\beta$, $\gamma$ and $\delta$ are such that the electroneutrality of compounds of the formulae $M_\alpha(NO_3)_\beta$ and $M'_\gamma A_\delta$ is respected, wherein:

the molar ratio of salts S1 and S2 ($RM_{S1/S2}$), defined by the following equation (1)

$$\frac{\beta \cdot n_1}{\delta \cdot n_2}, \quad (1)$$

is greater than 1.5, and wherein said rechargeable lithium-metal-gel battery has at least one positive electrode, at least one non-aqueous electrolyte and at least one negative electrode based on lithium metal or a lithium alloy, said positive electrode and said electrolyte being one or both gel and forming an {electrolyte+positive electrode} complex, and wherein said battery is free of polysulfide ions.

2. The ion conductivity promoter as claimed in claim 1, wherein:

1) the electrolyte contains at least one salt S1 and at least one salt S2 and the positive electrode contains neither salt S1 nor salt S2, or 2) the electrolyte contains neither salt S1 nor salt S2 and the positive electrode contains at least one salt S1 and at least one salt S2, or 3) the electrolyte contains only one salt S1 and the positive electrode contains only one salt S2, or 4) the electrolyte contains only one salt S2 and the positive electrode contains only one salt S1, or 5) the electrolyte and the positive electrode each contain at least one salt S1 and at least one salt S2, the molar ratios of the salts S1 and S2 within the electrolyte ($RM_{S1/S2\ Electrolyte}$) and within the positive electrode ($RM_{S1/S2\ Elect.\ Positive}$) which may be identical or different from one another provided that the molar ratio $RM_{S1/S2}$ within the battery is greater than 1.5, or 6) the electrolyte contains only one of the salts S1 and S2 and the positive electrode contains at least one salt S1 and at least one salt S2, or 7) the electrolyte contains at least one salt S1 and at least one salt S2 and the positive electrode contains only one of the salts S1 and S2.

3. The ion conductivity promoter as claimed in claim 1, wherein the molar ratio $RM_{S1/S2}$ is greater than or equal to 10.

4. The ion conductivity promoter as claimed in claim 1, wherein the total content of salts S1 and S2 varies from 0.5 to 30 mass %, based on the mass of said {electrolyte+positive electrode} complex.

5. The ion conductivity promoter as claimed in claim 1, wherein the cations M and M' of the salts S1 and S2 are selected from alkali metals.

6. The ion conductivity promoter as claimed in claim 5, wherein the alkali metals are selected from lithium, sodium, potassium, rubidium, cesium and francium.

7. The ion conductivity promoter as claimed in claim 1, wherein M and M' are both lithium cations.

8. The ion conductivity promoter as claimed in claim 1, wherein the salt S1 is lithium nitrate.

9. The ion conductivity promoter as claimed in claim 1, wherein the anion A is selected from triflate, perchlorate, perfluorate, bis(trifluoromethanesulfonyl)imide, bis(fluorosulfonyl)imide, bis(pentafluoroethylsulfonyl)imide, tetrafluoroborate and bis(oxalato)borate.

10. The ion conductivity promoter as claimed in claim 1, wherein the salt S2 is selected from lithium bis(trifluoromethylsulfonyl)imide and lithium bis(fluorosulfonyl)imide.

11. The ion conductivity promoter as claimed in claim 1, wherein the mixture comprises lithium nitrate as salt S1 and lithium bis(trifluoromethylsulfonyl)imide or lithium bis(fluorosulfonyl)imide as salt S2.

12. A composite gel positive electrode for a lithium-gel battery, said composite electrode comprising:

at least one positive electrode active material reversibly inserting lithium ions, at least one polymer binder, at least one solvent, at least one gelling polymer and at least one mixture of:

i) a first salt S1 of the formula $M_\alpha(NO_3)_\beta$ in a molar concentration C1 and a molar number n1 and, and ii) a second salt S2 of the formula $M'_\gamma A_\delta$ in a molar concentration C2 and a molar number n2 and, for which:

M and M' are organic or inorganic cations, it being understood that at least one of M and M' is a lithium cation, and A is an anion, $\alpha$, $\beta$, $\gamma$ and $\delta$ are such that the electroneutrality of compounds of the formulae $M_\alpha(NO_3)_\beta$ and $M'_\gamma A_\delta$ is respected, said mixture being such that:

the total molar concentration [C1+C2] of salts S1 and S2 varies from 0.5 to 10 mol/L, and the molar ratio of salts S1 and S2 ($RM_{S1/S2}$), defined by the following equation (1)

$$\frac{\beta \cdot n_1}{\delta \cdot n_2}, \quad (1)$$

is greater than 1.5.

13. The electrode as claimed in claim 12, wherein the mixture of salts S1 and S2 is 0.5 to 10 mass %, based on the total weight of said positive electrode.

14. The electrode as claimed in claim 12, wherein the positive electrode active material is 55 to 90 mass % relative to the total mass of the positive electrode material.

15. The electrode as claimed in claim 12, wherein said electrode is deposited on a current collector.

16. The electrode as claimed in claim 12, wherein the positive electrode active material is selected from lithium iron phosphates.

17. A lithium-gel battery comprising:

a positive electrode, a negative electrode based on lithium metal or a lithium alloy, an electrolyte disposed between said positive electrode and said negative electrode, wherein said battery is free of polysulfide ions, and wherein said battery also comprises:

i) a first salt S1 of the formula $M_\alpha(NO_3)_\beta$ in a molar number n1, and ii) a second salt S2 of the formula $M'_\gamma A_\delta$ in a molar number n2, for which:

M and M' are organic or inorganic cations, it being understood that at least one of M and M' is a lithium cation, and A is an anion, $\alpha$, $\beta$, $\gamma$ and $\delta$ are such that the electroneutrality of compounds of the formulae $M_\alpha(NO_3)_\beta$ and $M'_\gamma A_\delta$ is respected, the molar ratio of salts S1 and S2 ($RM_{S1/S2}$), defined by the following equation (1)

$$\frac{\beta \cdot n_1}{\delta \cdot n_2}, \qquad (1)$$

is greater than 1.5, said salts S1 and S2, independently of each other, being present, before the first charge/discharge cycle of said battery, within the electrolyte or within the positive electrode or within both the electrolyte and the positive electrode, one and/or the other of said positive electrode and said electrolyte being gel.

* * * * *